(12) United States Patent
Carr

(10) Patent No.: US 11,796,834 B2
(45) Date of Patent: *Oct. 24, 2023

(54) METHOD AND APPARATUS FOR RETAINING EYEGLASSES

(71) Applicant: Gregory W. Carr, Dallas, TX (US)

(72) Inventor: Gregory W. Carr, Dallas, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/211,709

(22) Filed: Mar. 24, 2021

(65) Prior Publication Data

US 2021/0208422 A1    Jul. 8, 2021

Related U.S. Application Data

(63) Continuation of application No. 16/373,554, filed on Apr. 2, 2019, now abandoned, which is a continuation of application No. 15/187,758, filed on Jun. 20, 2016, now Pat. No. 10,247,958.

(60) Provisional application No. 62/182,334, filed on Jun. 19, 2015.

(51) Int. Cl.
| | |
|---|---|
| *A45F 5/02* | (2006.01) |
| *G02C 5/00* | (2006.01) |
| *G02C 5/14* | (2006.01) |
| *G02C 3/04* | (2006.01) |

(52) U.S. Cl.
CPC .............. *G02C 5/14* (2013.01); *G02C 3/04* (2013.01); *A45F 2200/0541* (2013.01); *G02C 2200/02* (2013.01); *G02C 2200/20* (2013.01)

(58) Field of Classification Search
None
See application file for complete search history.

(56) References Cited

U.S. PATENT DOCUMENTS

| | | |
|---|---|---|
| 1,973,648 A | 9/1934 | Nagel |
| 3,178,784 A | 4/1965 | Krauthamer |
| 3,741,376 A | 6/1973 | Brown et al. |
| 4,290,522 A | 9/1981 | Takasaki |
| 4,771,515 A | 9/1988 | Guarro |
| 4,903,375 A | 2/1990 | Difranco |
| 5,278,591 A | 1/1994 | Trotter |
| 5,414,906 A | 5/1995 | Kren |
| 5,491,878 A | 2/1996 | Janouschek |
| 5,551,126 A | 9/1996 | Wallo |
| 6,017,120 A | 1/2000 | Mccormick |
| 6,116,412 A | 9/2000 | Rogers |

(Continued)

FOREIGN PATENT DOCUMENTS

| | | |
|---|---|---|
| CN | 2932421 Y | 8/2007 |
| CN | 201527512 U | 7/2010 |

(Continued)

OTHER PUBLICATIONS

"BMC Interchangeable Snap Button Centerpiece Eye Glass Holding Magnetic Brooch"; May 2, 2015; https://www.amazon.com/Interchangeable-Centerpiece-Holding-Magnetic-Brooch/dp/B00Y18RJUY/ref=sr_1_1?s=apparel&ie=UTF8&qid=1480535831&sr=1-1&nodeID=3478927011&keywords=eyeglass+holder&refinements=p_89%3Ab.m.c.

(Continued)

*Primary Examiner* — Darryl J Collins
(74) *Attorney, Agent, or Firm* — CARR Law Firm PLLC

(57) ABSTRACT

The present invention includes an apparatus and a method for retaining eyeglasses on a remote panel with a holding element positioned on the remote panel and a temple element positioned on the eyeglasses.

20 Claims, 8 Drawing Sheets

(56) References Cited

U.S. PATENT DOCUMENTS

| | | | |
|---|---|---|---|
| 6,168,273 B1 | 1/2001 | Dupraz et al. | |
| 6,260,749 B1 | 7/2001 | Horovitz | |
| 6,367,126 B1 | 4/2002 | Rivkin | |
| 6,425,664 B1* | 7/2002 | Liu | G02C 11/00 |
| | | | 351/111 |
| 6,568,805 B1 | 5/2003 | Dietz | |
| 6,616,274 B1 | 9/2003 | Sabia et al. | |
| 7,172,283 B1 | 2/2007 | Asta | |
| 7,229,172 B2 | 6/2007 | Presswood, Jr. et al. | |
| 7,496,991 B2 | 3/2009 | Avery et al. | |
| 7,553,018 B1 | 6/2009 | Riazi | |
| 7,721,392 B2 | 5/2010 | Avery et al. | |
| 8,381,359 B1 | 2/2013 | Mcardle | |
| 8,460,488 B2 | 6/2013 | Chauvin | |
| 8,469,511 B2 | 6/2013 | Miller et al. | |
| 8,696,112 B1 | 4/2014 | Vaught | |
| 10,247,958 B1* | 4/2019 | Carr | G02C 3/04 |
| 2004/0183993 A1* | 9/2004 | Dietz | G02C 3/04 |
| | | | 351/41 |
| 2004/0239873 A1* | 12/2004 | Dietz | G02C 11/00 |
| | | | 351/111 |
| 2005/0144760 A1 | 7/2005 | Verbaas et al. | |
| 2006/0055866 A1 | 3/2006 | Dietz | |
| 2006/0196900 A1 | 9/2006 | Sasick et al. | |
| 2009/0007388 A1* | 1/2009 | Villeneuve | A45F 5/02 |
| | | | 24/3.3 |
| 2010/0083699 A1 | 4/2010 | Conigliaro | |
| 2010/0157237 A1 | 6/2010 | Mor et al. | |
| 2013/0167328 A1 | 7/2013 | Brown | |
| 2014/0022504 A1 | 1/2014 | Peterson | |
| 2015/0234201 A1* | 8/2015 | Levesque | G02C 11/00 |
| | | | 24/303 |
| 2018/0335641 A1* | 11/2018 | Ernica | G02C 5/146 |

FOREIGN PATENT DOCUMENTS

| | | |
|---|---|---|
| CN | 204166230 U | 2/2015 |
| DE | 202012004874 U1 | 8/2012 |
| DE | 102014006044 A1 | 8/2015 |
| GB | 2499854 A | 9/2013 |

OTHER PUBLICATIONS

"LidsLash Easy-to-Use Magnetic Sunglasses & Glasses Strap—Hat eyewear Retainer"; May 2, 2015; https://www.amazon.com/LidsLash-Easy-Magnetic-Glasses-Sunglass/dp/B00MWGWB7A/ref=sr_1_1?ie=UTF8&qid=1480536075&sr=8-1&keywords=eyeglass+holder+LidsLash.

"ReaderREST Shark Tank Product, Stainless, Black and Crystal 3-Pack"; May 2, 2015; https://www.amazon.com/s/ref=sr_nr_p_89_11?fst=as%3Aoff&rh=i%3Aaps%2Ck%3Aeyeglass+holder%2Cp_89%BAReadeREST&keywords=eyeglass+holder&ie=UTF8&qid=1480534539&mid=2528832011.

International Search Report, dated Dec. 13, 2019, by the ISA/EP, re PCT Application No. PCT/US2019/025213.

Written Opinion, dated Dec. 13, 2019, by the ISA/EP, re PCT Application No. PCT/US2019/025213.

* cited by examiner

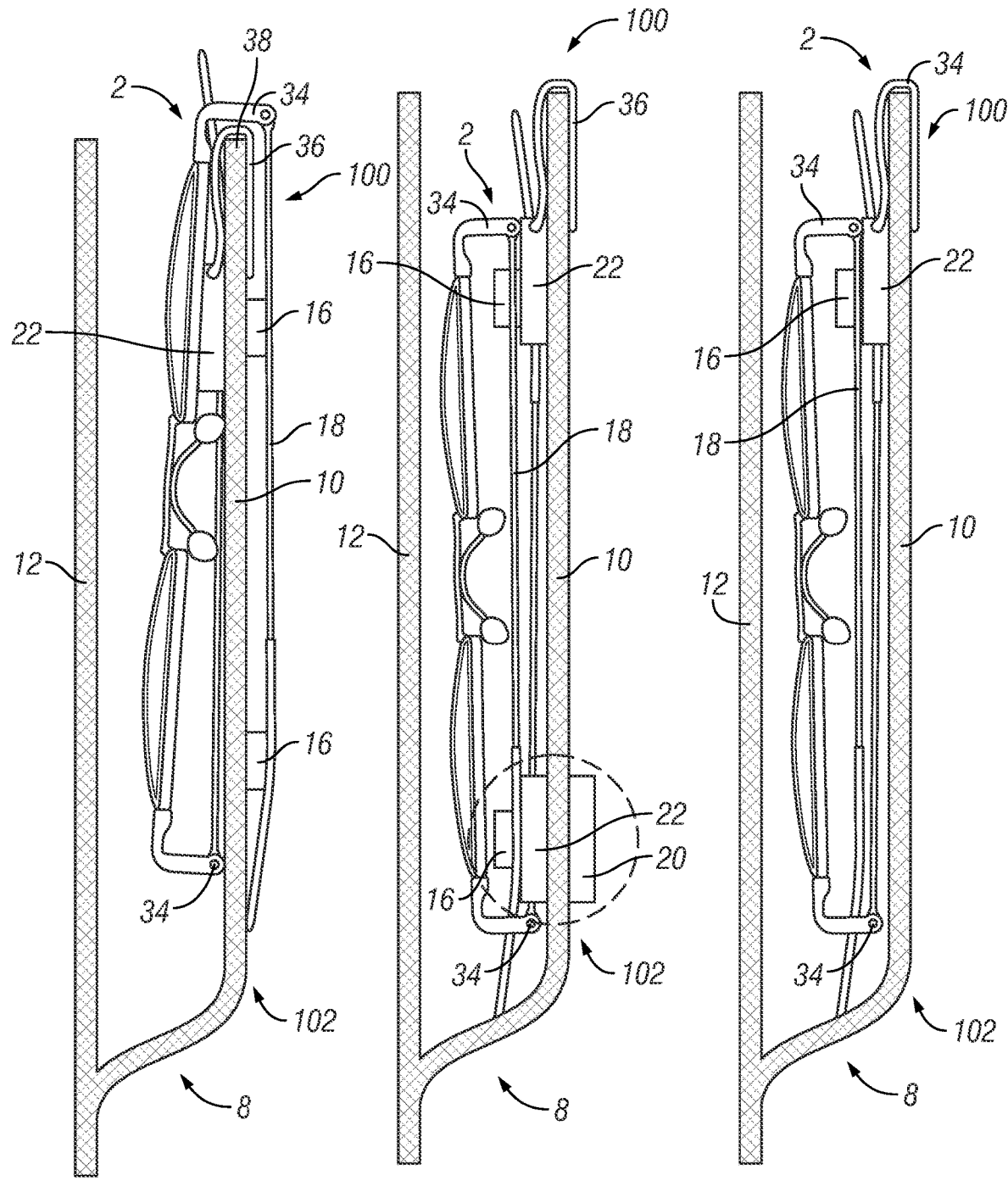
*FIG. 14*   *FIG. 15*   *FIG. 16*

METHOD AND APPARATUS FOR RETAINING EYEGLASSES

CROSS-REFERENCE TO RELATED APPLICATIONS

The application is a continuation of U.S. patent application Ser. No. 16/373,554 entitled "METHOD AND APPARATUS FOR RETAINING EYEGLASSES," filed Apr. 2, 2019, which is a continuation of U.S. patent application Ser. No. 15/187,758 entitled "METHOD AND APPARATUS FOR RETAINING EYEGLASSES," filed Jun. 20, 2016, which claims the benefit of the filing date of U.S. provisional patent application Ser. No. 62/182,334 entitled "EYEGLASSES RETAINER," filed Jun. 19, 2015, and the entire contents of both such applications are incorporated herein by reference for all purposes.

FIELD OF THE INVENTION

The present invention relates to the field of eyeglass retainers and, more particularly, directed to a method and an apparatus for retaining a pair of eyeglasses in a receptacle, pocket or the like.

BACKGROUND OF THE INVENTION

Eyeglasses are taken off and put on by users for periods of time depending on whether vision correction is needed, as the environment and vision needs change between near and distance vision. A convenient place commonly used to put eyeglasses immediately after being taken off, carry them, and keep them readily accessible for later use is the breast pocket of a shirt or an eyeglass case kept in the breast pocket, for example. However, eyeglasses and cases they are kept in can easily fall or bounce out of pockets when the wearer bends over to look at or pick up something, for example, or simply moves abruptly. Accordingly, there is a need to help keep eyeglasses and eyeglass cases from falling out of pockets.

SUMMARY

Provided is a method and an apparatus for retaining eyeglasses or eyeglass cases in a receptacle, case, pocket, or the like.

BRIEF DESCRIPTION OF THE DRAWINGS

For a more complete understanding of the features and advantages thereof, reference is now made to the following Detailed Description taken in conjunction with the accompanying drawings, in which:

FIG. 14 is a schematic side-view showing a pair of eyeglasses retained inside a pocket, such as, for example, a shirt breast pocket, with a temple element folded over the outer panel of the pocket;

FIG. 15 is a schematic side-view showing a pair of eyeglasses retained inside a pocket, such as, for example, a shirt breast pocket;

FIG. 16 is a schematic side-view showing a pair of eyeglasses retained inside a pocket, such as, for example, a shirt breast pocket;

DETAILED DESCRIPTION OF THE INVENTION

Figure 1:
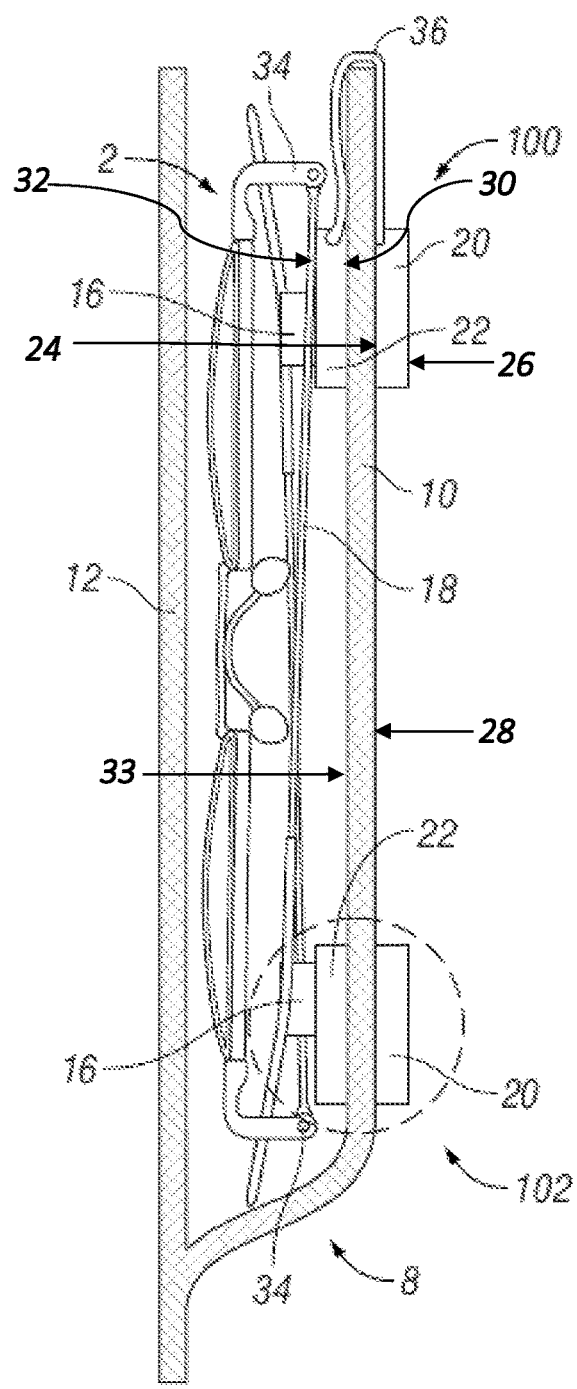
FIG. 1 is a schematic side-view showing a pair of eyeglasses retained inside a pocket, such as, for example, a shirt breast pocket.

In the following discussion, numerous specific details are set forth to provide a thorough understanding of the present invention. However, those skilled in the art will appreciate that the present invention may be practiced without such specific details. In other instances, certain specific details, and the like have been omitted inasmuch as such details are not considered necessary to obtain a complete understanding of the present invention, and are considered to be within the understanding of persons of ordinary skill in the relevant art.

FIGS. 1 through 20 illustrate various configurations of eyeglasses retainers for retaining or coupling a pair of eyeglasses 2 to a remote panel. The remote panel may comprise a fabric panel from an article of clothing. The eyeglasses retainers may be used to couple the pair of eyeglasses 2 to a variety of articles of clothing, such as, for example, shirts, coats, jackets, pants, shorts, and the like. The fabric panel may vary depending on the fabric of the article of clothing the eyeglasses 2 are being coupled to. The fabric panel may include a variety of materials, such as, for example, cotton, cotton blends, leather, polyester, wool, silk, synthetics, blends, satin, denim, linen, flannel, lace, and the like. Throughout FIGS. 1 through 20, parts that are identical or substantially the same in structure and function are identified with the same reference numeral.

The eyeglasses retainers may restrain the pair of eyeglasses 2 relative to an article of clothing. The article of clothing may comprise a pocket 8 in which the eyeglasses 2 are being kept. The eyeglasses retainer may be used to couple the eyeglasses 2 to at least one of the fabric panels the pocket 8 comprises. Magnetically coupling the eyeglasses 2 to at least one of the pocket panels may restrain the eyeglasses 2 inside of or to the pocket 8. Restraining the eyeglasses 2 by coupling or securing to the eyeglass retainer may prevent the common problem of the eyeglasses 2 inadvertently slipping or falling out of the pocket 8 and being damaged, lost, or simply being a nuisance. An eyeglasses retainer may alternatively be used to couple the eyeglasses 2 directly to an article of clothing, outside of the pocket. An eyeglasses retainer may also be used to restrain items other than eyeglasses within a pocket 8, such as, for example, pens, pencils and other objects kept in pockets.

Figure 2:
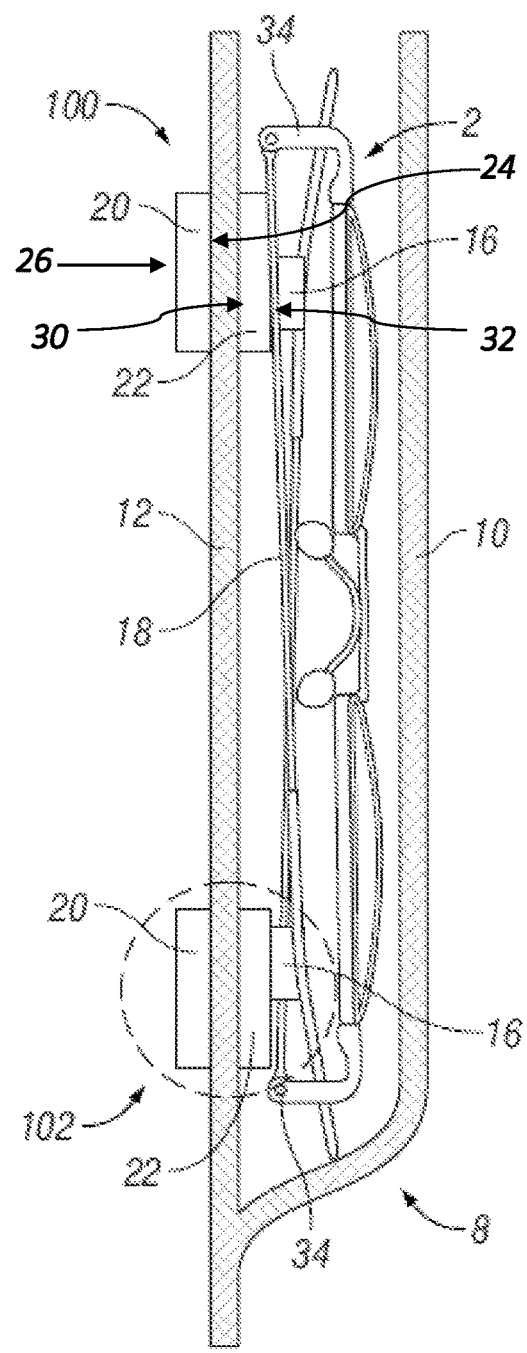
FIG. 2 is a schematic side-view showing a pair of eyeglasses retained inside a pocket, such as, for example, a shirt breast pocket.

Turning to the configurations of FIGS. 1 and 2, the eyeglasses retainer may be used to retain eyeglasses 2 inside the pocket 8 of a shirt. In the example shown in FIG. 1, the pocket 8 may be a breast pocket of the shirt comprising a pocket panel 10 and a shirt panel 12. The eyeglass retainer may comprise an outer holding element 20 and an inner holding element 22 positioned on opposite sides of the pocket panel 10. The outer and inner holding elements 20, 22 may be capable of holding a position on one of the pocket panel 10 or the shirt panel 12 of the pocket 8. The eyeglass retainer may further comprise a temple element 16 magnetically attracted to at least one of the outer and inner holding elements 20, 22. The temple element 16 may be positioned on a temple 18 of the eyeglasses 2. The holding elements 20, 22 may be positioned near or immediately adjacent the location of the temple element 16 and where the eyeglasses 2 naturally rest within the pocket 8. The temple element 16 may retain the eyeglasses 2 by using the magnetic attractive force between the temple element 16 and the holding elements 20, 22. The holding elements 20, 22 may be a pair of mutually attracted magnets. Or one of the holding elements 20, 22 may be a magnet, and the other comprised of ferromagnetic or magnetically attracted material.

An eyeglasses retainer may be positioned near the lower end 102 of the pocket 8 (shown within a broken line circle), and used alternatively or in combination on pocket panel 10 with the eyeglasses retainer near the top end 100 of the pocket 8. One or more temple elements 16 may be used, each with respective holding elements 20, 22, to couple the eyeglasses 2 to the pocket panel 10. The temple elements 16 may be positioned to couple various portions of the temple 18 or eyeglasses 2 to the fabric panel. The second eyeglass retainer 110 may also be used to couple more than one temple to the engaged fabric panel. The locations 100, 102 of the retainers are shown, for purposes of example, near the top and bottom of the pocket 8. However, the locations 100, 102 of the retainers may be varied at other locations on pocket panel 10, as desired. The lower and upper eyeglasses retainers may be used together or alone to retain the same pair of eyeglasses 2 or multiple different pairs of eyeglasses 2. The lower eyeglasses retainer, in the example shown, may couple with a temple element 16 positioned near the tip of temple 18 that rests on the ear of a user. Or, if the eyeglasses 2 are placed in the pocket 8 with the other end being inserted first, the temple element 16 near the hinge of the eyeglasses 2 will couple with the lower pair of holding elements 20 and 22. Temple element 16 may be placed at a different location relative to either or both of the pocket panel 10 or eyeglasses 2, or without the other eyeglasses retainer to retain the same or a different pair of eyeglasses. For example, the eyeglasses 2 could be retained in the pocket 8 by use of the upper holding elements 20 and 22 and the associated temple element 16 without use of the lower holding elements 20 and 22, and vice versa. Or, both of the upper and lower eyeglasses retainers and one or both of the associated temple elements 16 may be used in combination to retain the eyeglasses 2 in the pocket 8.

When the eyeglasses retainer is use with the pocket panel 10 of pocket 8, the outer holding elements 20 may be visibly exposed as the retainer is being used. The outer element outer surface 26 of the outer holding element 20 may comprise a visible façade, image, art, text, decorative façade, color, design, pattern, and the like to decorate the outer holding element 20 when shown.

FIG. 1 shows the eyeglass retainer coupling the eyeglasses 2 to the pocket panel 10 near the upper end 100 of the shirt pocket 8. The eyeglasses 2 may be retained by magnetically coupling the temple element 16 positioned on temple 18 of the eyeglasses 2 to the holding elements 20 and 22. The magnetic attraction between the temple element 16 and the holding elements 20 and 22 tends to maintain the position of the eyeglasses 2 relative to the holding elements 20 and 22 and the pocket panel 10.

The temple element 16 may comprise a ferromagnetic material temporarily or permanently positioned on the temple 18 of the eyeglasses 2. The temple element 16 may also comprise magnetic material or a combination of magnetic and ferromagnetic material. The temple element 16 may be affixed to the temple 18 by any means and method known to one of ordinary skill in the art, including being entirely or partially embedded in the temple 18, bonded to the temple 18 with glue or an adhesive, mechanically coupled to the temple 18 by being wrapped or bent around the body of the temple 18, two magnetically attracted portions clamped about the temple 18 by magnetic force, and the like.

Alternatively, the temples 18 and/or other parts of the eyeglasses 2 itself may comprise magnetic, ferrous, ferromagnetic and/or magnetically attracted material such that a magnetically attractive force may exist between the temples 18 and/or other parts of the eyeglasses 2 and the holding elements 20, 22. In that case, the eyeglasses 2 may be magnetically coupled to the holding elements 20, 22 themselves and the temple element 16 may be omitted. As well, the eyeglasses may be magnetically coupled to the holding elements 20, 22 at locations other or in addition to one or more locations on the temples 18.

For example, magnetic, ferrous, ferromagnetic and/or magnetically attracted material could be located at, secured to and/or comprise a joint or hinge interconnecting either or both temples 16 with the eyeglasses frame or lenses, all or any portion of the eyeglasses frame (including all or any portion of the bridge, nose pads, etc.), and all or any portion of the eyeglasses lenses. In addition to comprising or forming a portion of the eyeglasses at the location of such material, such material may comprise an insert embedded, molded into, glued onto, or otherwise secured to the exterior of the eyeglasses in any manner similar to those described herein with respect to the temples 18.

Figures 3, 4, 5:
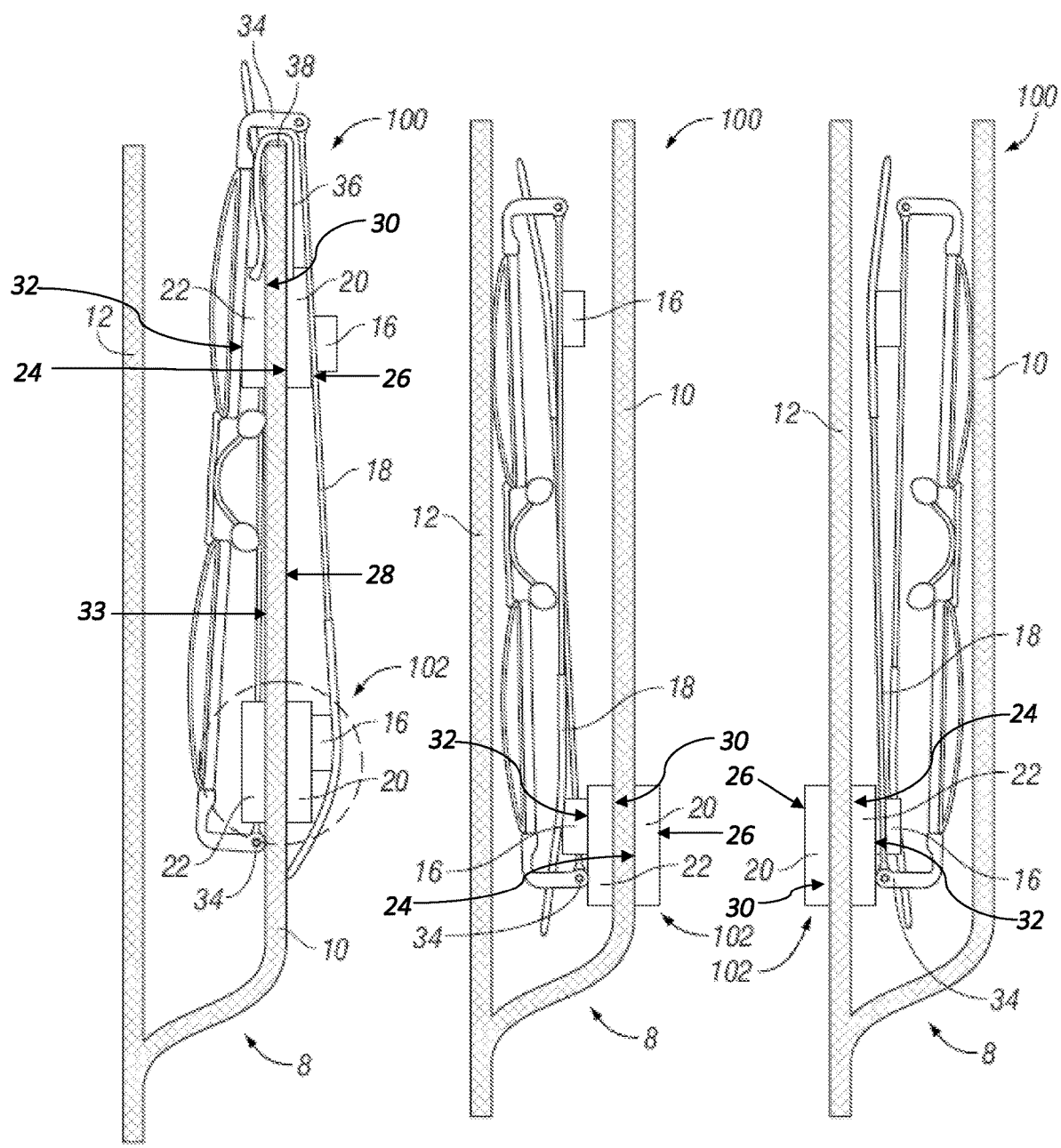
FIG. 3 is a schematic side-view showing a pair of eyeglasses retained inside a pocket, such as, for example, a shirt breast pocket, with a temple element folded over the outer panel of the pocket.
FIG. 4 is a schematic side-view showing a pair of eyeglasses retained inside a pocket, such as, for example, a shirt breast pocket.
FIG. 5 is a schematic side-view showing a pair of eyeglasses retained inside a pocket, such as, for example, a shirt breast pocket.

The temple element 16 may also be positioned on various locations along the length of the entire temple 18, as well as on either the inside (near the user when eyeglasses 2 are worn, as is shown for example at the end of the temple 18 near the upper end 100 of the pocket 8) or outside of the temple 18 (as is shown for example at the end of the temple 18 near the upper end 100 of the pocket 8 in FIG. 5). The temple element 16 may also be placed on the inside or outside of the temple 18. Additionally, the temple element 16 may comprise a length of material extending along the outside and/or within a portion of or the entire length of the temple 18. Further, for ease of illustration, the temple element 16 is shown in various placements on temple 18; however, temple 16 may alternatively or additionally be placed at or comprise similar locations or portions of the other corresponding temple of the eyeglasses 2. The temple element 16 may be placed at or comprise multiple locations and portions of temple 18 and/or its corresponding temple.

For ease of illustration, the temple element 16 and the holding elements 20 and 21 are shown rectangular from the side; however, temple element 16 and holding elements 20 and 21 may be formed in a variety of shapes and designs to address aesthetic and functional considerations and preferences, and may comprise all or part of a temple 18 of the eyeglasses 2.

When positioning each of the upper and lower eyeglasses retainers for use, the outer holding element 20 and the inner holding element 22 may be positioned on opposite sides of the pocket panel 10 as shown in FIG. 1. Magnetic attraction between the holding elements 20 and 22, pulling each against the interposed portion of the pocket panel 10, and the resulting friction resist movement of the holding elements 20 and 22 along the pocket panel 10.

The outer holding element 20 may comprise an outer element contact surface 24 and an outer element outer surface 26. The outer element contact surface 24 may be in direct contact with an outer surface 28 of the pocket panel 10. The outer element outer surface 26 may be on the opposite end of the outer element contact surface 24. The inner holding element 22 may comprise an inner element contact surface 30 and a temple surface 32. The inner element contact surface 30 may be in direct contact with an inner surface 33 of the pocket panel 10. The temple surface 32 may be on the opposite end of the inner element contact surface 30.

In FIG. 1, the eyeglasses 2 may be magnetically coupled to the eyeglass retainer for securing the eyeglasses 2 to the pocket panel 10. To couple the eyeglasses 2 to the eyeglasses retainer at the upper end 100 of the pocket 8, the upper temple element 16 of the eyeglasses retainer may be positioned on the temple 18 near a hinge 34 of the eyeglasses 2. The temple 18 and the temple element 16 may then magnetically couple with the inner holding element 22 to restrain the eyeglasses 2 with the upper eyeglasses retainer. The temple element 16 may couple the temple 18 of the eyeglasses 2 to the upper eyeglasses retainer using an attractive force between the temple element 16 and the inner holding element 22 and/or outer holding element 20. Greater attractive force may be provided by the inner holding element 22 (the element closest to temple element 16) comprising magnet material. The magnetic force applied across the pocket panel 10 due to the attraction between the temple element 16 and the inner holding element 22 may retain the position of the eyeglasses 2 within the pocket 8.

In FIG. 1, the outer and inner holding elements 20, 22 of the eyeglasses retainer may also comprise an optional U-shaped retainer holder 36 comprising a clip or flexible strap for securing the holding elements 20, 22 to the pocket panel 10. The optional retainer holder 36 may be connected to the outer holding element 20 on one end and the inner holding element 22 on the other end. The retainer holder 36 may be used to couple the outer and inner holding elements 20, 22 in place on opposite sides at or near the top of the pocket panel 10. When using the retainer holder 36 to couple the holding elements 20, 22 to the pocket panel 10, the retainer holder 36 may be positioned over the top edge 38 of the pocket panel 10 to place the holding elements 20, 22 a desired distance from the top edge 38. If a flexible strap is used, the strap may comprise a flexible fabric, plastic or the like that spaces the holding elements 20, 22 from the top of the pocket, but does not hold the holding elements 20, 22 in place. If the flexible strap is used, one of the holding elements 20, 22 should be a magnet. Alternatively, if the temple element 16 comprises a high strength magnet, the magnetic force from the temple element 16 may be strong enough to keep both the holding elements 20, 22 and the eyeglasses 2 in place.

As is shown in FIGS. 9-16, the retainer holder 36 may be a clip coupled to only one of either of the holding elements 20, 22, holding it inside or outside of the pocket 8, as desired. The retainer holder 36 may be bent, folded, or slipped over the top edge of the pocket 10 until the edge of the pocket panel 10 reaches the concaved end of the retainer holder 36, to position the holding elements 20 and 22 a preferred distance from the edge. Magnetic attraction between the holding elements 20 and 22 may cause them to pinch against the pocket panel 10 sufficiently to retain the holding elements 20 and 22 where placed. The retainer holder 36, if a clip, may add a pinching compressive force to keep the holding elements 20 and 22 in place. The retainer holder 36 may be optional and not used at all for maintaining the position of the holding elements 20, 22. The retainer holder 36 may be of various sizes and shapes depending on the size of the holding elements 20, 22. The retainer holder 36, if a clip, may be formed from any materials such as plastic, metal, and the like to hold and position the holding elements 20, 22 on the fabric panel.

Alternatively, the inner and outer holding element 22, 20 may be positioned and coupled to the pocket panel 10 using attractive magnetic forces. One or both of the inner and outer holding element 22, 20 may comprise magnets, ferrous and/or magnetically attracted materials. The eyeglasses retainers may provide magnetic attraction or coupling between various combinations of magnetic and possibly ferromagnetic holding elements mounted on and/or forming part of the eyeglasses 2 and mounted on and/or forming part of the fabric adjacent the eyeglasses 2 to restrain movement of the eyeglasses 2 relative to the fabric. The degree of restraining force may be varied, depending, for example, on the amount of magnetic attraction (e.g., size, shape, and nature of magnetic and/or ferromagnetic materials used); weight of the eyeglasses to be restrained; fabric thickness; degree of frictional resistance to movement caused by the contacting surfaces (e.g., smooth or textured) of the eyeglasses, fabric, and/or retaining elements; degree of resistance to movement desired; and the like. Rare earth magnets, having a relatively strong magnetic force, as well as other magnets may be used. The restraining force may be selected, for example, to allow removal of the eyeglasses 2 from the pocket 8 without undue tugging. The restraining force may also be selected, for example, to resisting sliding or bouncing of the eyeglasses out of the pocket when the wearer bends over at the waist (e.g., to look at or pick up an item or abruptly moves (e.g., runs or jumps).

The temple element 16 and the holding elements 20, 22 may each comprise a magnet, ferrous and/or magnetically attracted material, and the like. In embodiment configuration, the temple element 16 may be a magnet while the holding elements 20, 22 may be a may comprise a magnet or magnetic material. The position of the holding elements 20, 22 may be maintained in this configuration using the retainer 36. Alternatively, the holding elements 20, 22 may be a magnet and the temple element 16 may be a magnetically attracted material. The material use for constructing the temple element 16 may complement the material used for constructing the holding elements 20, 22 such that an attractive force exists between the temple element 16 and the holding elements 20, 22. When magnets, ferrous and/or magnetically attracted materials are used to construct the temple element 16 and the holding elements 20, 22, the attractive force between the temple element 16 and the holding elements 20, 22 may be a magnetic attractive force. The magnetic force between the temple element 16 and the holding elements 20, 22 may couple the eyeglasses 2 to the eyeglasses retainer when the temple element 16 is engaged with the holding elements 20, 22.

The outer holding element 20 and inner holding element 22 may be different or identical in one or more respects regarding the size, shape, composition, and the like. The temple element 16 may be identical or different in size, shape, composition and the like from the holding elements 20, 22. The magnetic strength may vary depending on whether more than one of the elements 16, 20, 22 are magnets, or if only a single magnet is used with one or more complementary elements comprising a magnetically attractive material. As noted previously, the strength of the magnet material used may also be varied depending on the material of the fabric panel the eyeglasses retainer may be used with. Additional embodiments of the eyeglasses retainer may be modified with stronger magnets for thicker fabrics such as those used in jackets, coats, sweaters, and the like.

In another configuration, one or both of the inner and outer holding elements 22, 20 may comprise a textured, rubber or rubber-like friction surface on the inner element contact surface 30 and the outer element contact surface 24, respectively, to increase friction and resistance to sliding movement along the pocket panel 10. The friction surface may comprise a rubber coating or layer. In a further configuration, at least one of the inner and outer holding elements 22, 20 may comprise a textured, rubber or rubber-like friction surface on the temple surface 32 and the outer element outer surface 26, respectively, to increase friction and resistance to sliding movement when coupled with the temple 18 or the temple element 16 positioned on the temple 18 to restrain the eyeglasses 2.

In FIG. 2, configuration of the eyeglasses retainer is shown with the holding elements 20, 22 coupled to the shirt panel 12 of the pocket 8. The temple element 16 positioned on the eyeglasses 2 near the hinge 34 may be magnetically coupled with the inner holding element 22 to retain the eyeglasses 2 inside the pocket 8. FIG. 2 also shows that alternatively, an optional second eyeglasses retainer may be used near the lower end 102 of the pocket 8 for securing eyeglasses 2 inside the pocket 8. An additional temple element 16 may be positioned on another portion of the temple 18 farther away from the hinge 34 to engage with second retainer coupled to the shirt panel 12. The second eyeglasses retainer may be used to restrain an additional portion of the same temple 18 or a different temple to the engaged fabric panel.

Turning to FIG. 3, in an embodiment, the eyeglasses retainer may be alternatively configured such that the temple element 16 positioned on the temple 18 may be magnetically coupled to the outer holding element 20 to restrain the eyeglasses 2. With this configuration, the eyeglasses 2 may be positioned with the lens of the eyeglasses 2 inside the pocket 8. The temple 18 comprising the temple element 16 may then be folded over the top edge 38 of the pocket panel 10 and in contact with the outer surface 28 of the pocket panel 10. The eyeglasses 2 may then be coupled to the eyeglasses retainer as the temple element 16 positioned on the folded temple 18 is engaged with the outer holding element 20. A second eyeglasses retainer may be used to restrain the second portion of the folded temple 18 relative to the pocket panel 10. An additional temple element 16 may be positioned on another portion of the folded temple 18 farther away from the hinge 34, near the tip of the temple 18, and engaged with another holding element positioned deeper inside the pocket 8. The location 102 of the second eyeglasses retainer may vary depending on the preference of the user.

FIG. 4 shows the eyeglasses retainer configured such that the contact point between the temple element 16 near the hinge 34 of the eyeglasses 2 and the holding elements 20, 22 are at an alternate position near the lower end 102 of the pocket 8. The holding elements 20, 22 may be positioned near the bottom of the pocket 8 to allow the engagement between the temple element 16 and the inner holding element 22 occur at a location deeper in the pocket 8.

FIG. 5 shows the eyeglasses retainer engaged to the shirt panel 12 at an alternate position away from the opening of the pocket 8. The use of an attractive force between the inner holding element 22 and the outer holding element 20 to hold and position the holding elements 20, 22 may allow the holding element 20, 22 and therefore the eyeglasses retainer to be positioned at various locations on any fabric panel. In this example, the eyeglasses 2 may be coupled to the eyeglasses retainer inside the pocket 8 by magnetically coupling the temple element 16 positioned on the temple 18 with the inner holding element 22 inside the pocket 8. This configuration along with any configuration where the holding elements 20, 22 may be engaged with the shirt panel 12, may allow the outer holding element 20 to be positioned inside the shirt and unseen when the eyeglasses retainer is used.

Figures 6, 7, 8:
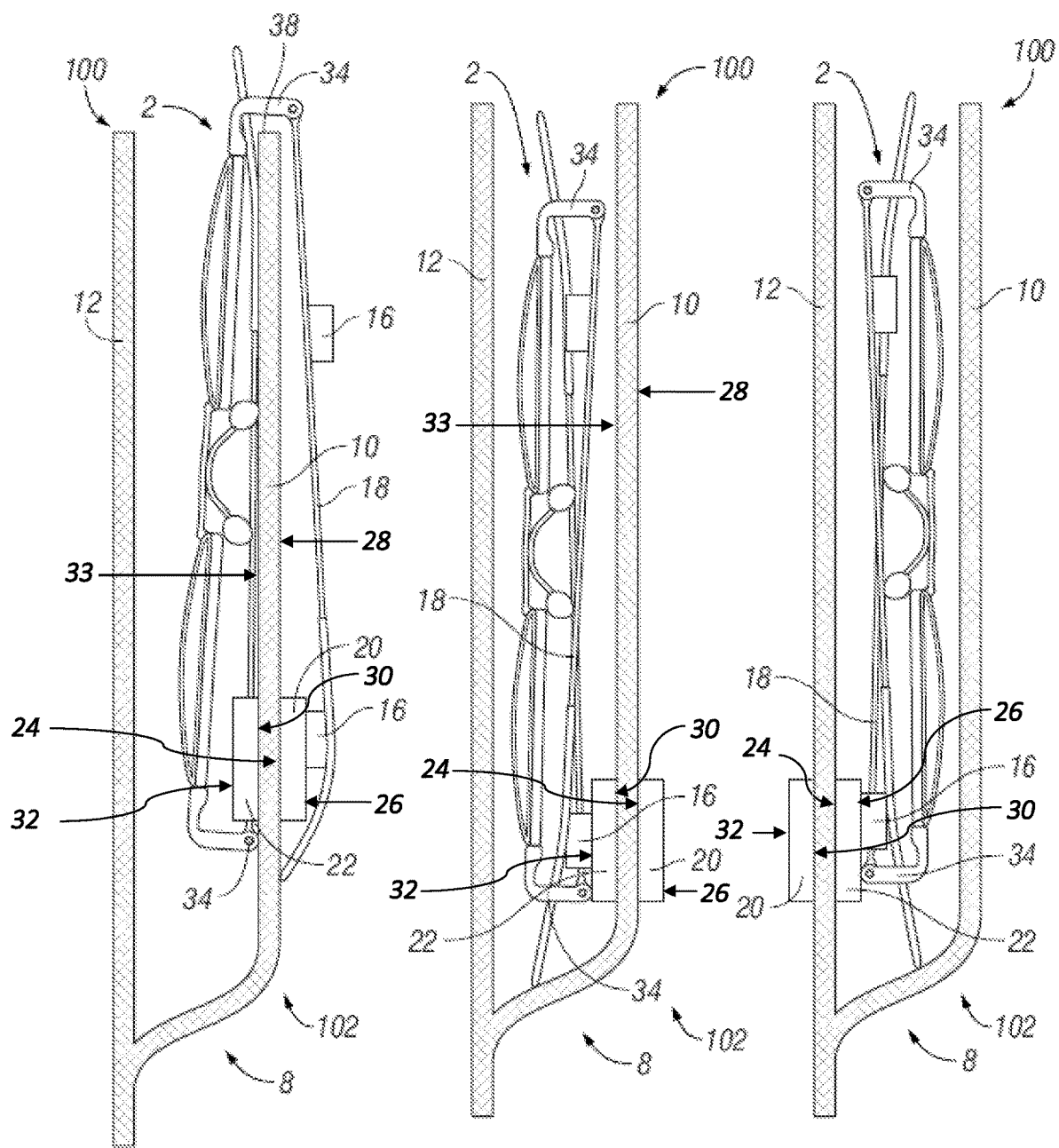
FIG. 6 is a schematic side-view showing a pair of eyeglasses retained inside a pocket, such as, for example, a shirt breast pocket, with a temple element folded over the outer panel of the pocket.
FIG. 7 is a schematic side-view showing a pair of eyeglasses retained inside a pocket, such as, for example, a shirt breast pocket.
FIG. 8 is a schematic side-view showing a pair of eyeglasses retained inside a pocket, such as, for example, a shirt breast pocket.

Turning to FIG. 6, the eyeglasses retainer may alternatively be configured such that the holding elements 20, 22 may be positioned at an alternate position on the pocket panel 10, and the temple element 16 may be magnetically coupled to the outer holding element 20 to retain the eyeglasses 2. The eyeglasses 2 may be positioned similar to the example in FIG. 3 where the lens of the eyeglasses 2 may be positioned inside the pocket 8 and the temple 18 comprising the temple element 16 folded over the top edge 38 of the pocket panel 10. The temple element 16 may instead be positioned on an alternate location on the folded temple 18 away from the hinge 34 and near the end of the temple 18. The eyeglasses 2 may then be similarly restrained relative to the pocket panel 10 by magnetically coupling the temple element 16 on the folded temple 18 with the outer element outer surface 26 of the outer holding element 20.

In FIG. 7, the eyeglasses retainer may alternatively be configured on the pocket panel 10 such that the temple element 16 positioned on the temple 18 away from the hinge 34 may be magnetically to the temple surface 32 of the inner holding element 22. The entire eyeglasses 2 may be inside the pocket 8 as the temple element 16 positioned on the end of the temple 18 is magnetically coupled with the inner holding element 22 positioned deep inside the pocket 8. In this example, the outer element outer surface 26 may be exposed as the outer holding element 20 contacts the outer surface 28 of the pocket panel 10 to maintain and hold the position of the inner holding element 22.

FIG. 8 shows the eyeglasses retainer alternatively configured on the shirt panel 12 such that the temple element 16 may be positioned on the temple 18 at an alternate location farther away from hinge 34 near the tip of the temple 18. The temple element 16 may then be magnetically coupled with the inner holding element 22 to retain the eyeglasses 2 within the pocket 8. In this configuration, the entire eyeglasses 2 may also be retained inside the pocket 8 by positioning the holding elements 20, 22 on the shirt panel 12. In this configuration, the eyeglasses retainer is also not exposed when used.

FIGS. 9-12 show the eyeglasses retainer alternatively configured to retain the eyeglasses 2 using a single outer holding element 20 magnetically coupled with the temple element 16. The single outer holding element 20 may be held and positioned on the pocket panel 10 using the retainer holder 36. The retainer holder 36 may be engaged over the top edge 38 of the pocket panel 10 which positions the outer holding element 20 near the opening of the pocket 8.

Figure 9:
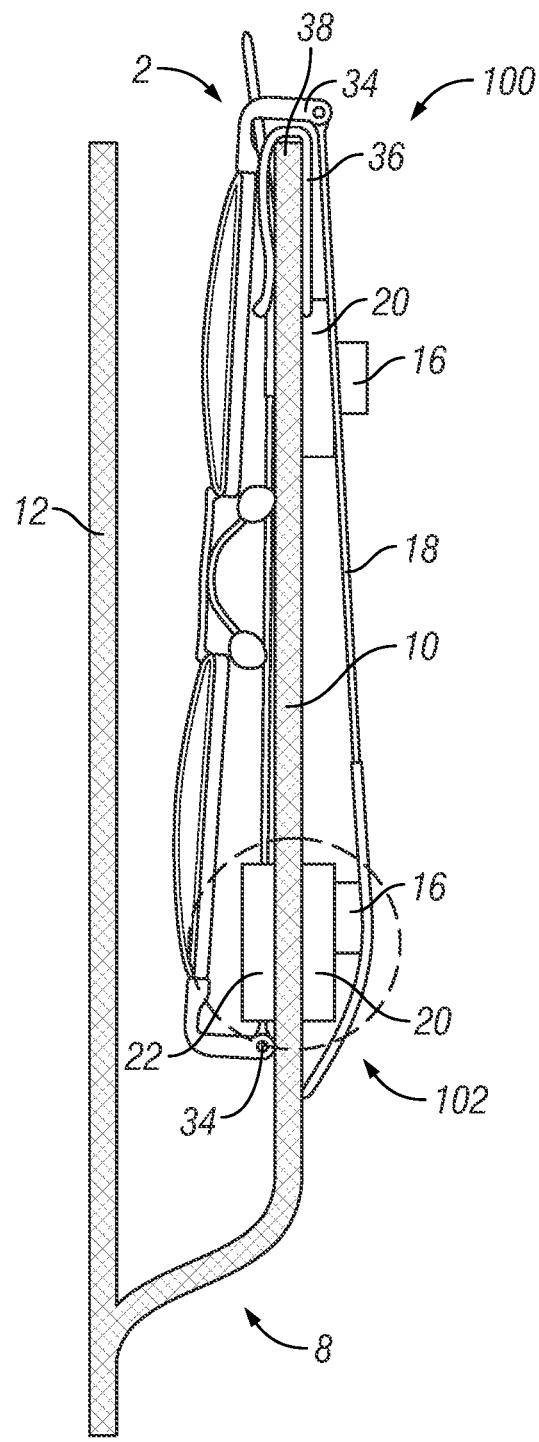
FIG. 9 is a schematic side-view showing a pair of eyeglasses retained inside a pocket, such as, for example, a shirt breast pocket, with a temple element folded over the outer panel of the pocket.
Figure 10:
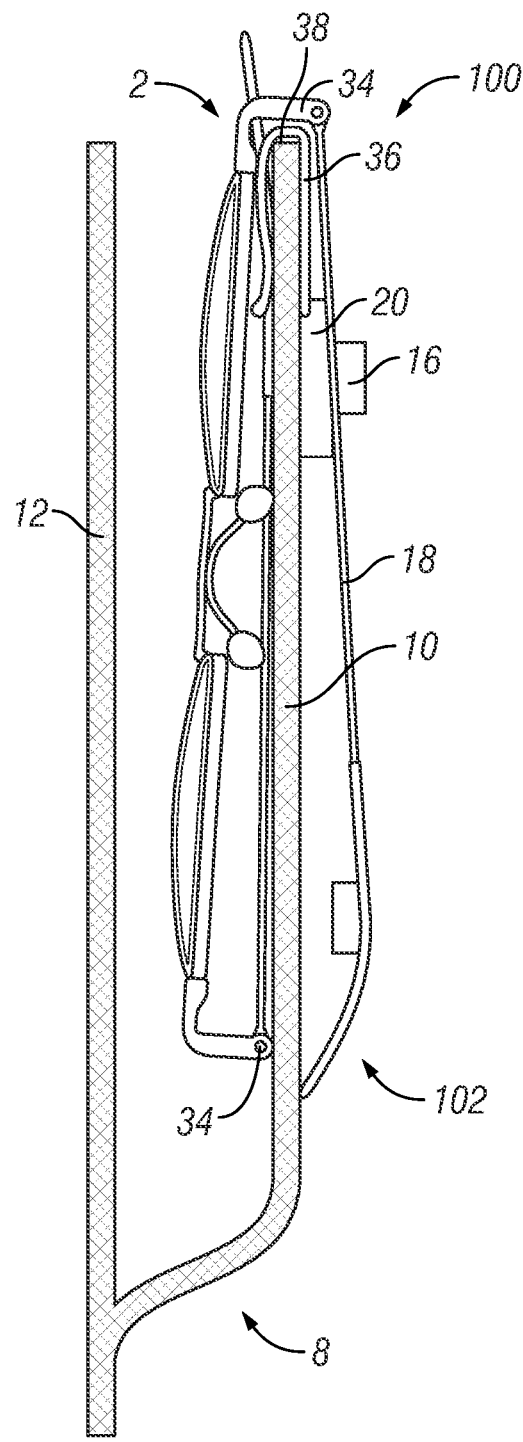
FIG. 10 is a schematic side-view showing a pair of eyeglasses retained inside a pocket, such as, for example, a shirt breast pocket, with a temple element folded over the outer panel of the pocket.

In FIGS. 9 and 10, the eyeglasses retainer may be configured to retain a portion of the eyeglasses inside the pocket 8. In this configuration, the temple 18 comprising the temple element 16 may be folded over the top edge 38 of the pocket panel 10 to engage the outer holding element 20. The temple element 16 may be positioned on the temple 18 near the hinge 34 to engage to engage the outer holding element 20 held by the retainer holder 36. In this embodiment, the position of the outer holding element 20 may vary depending on the size and length of the retainer holder 36 used to position the holding elements 20, 22.

FIG. 9 also shows the optional second eyeglasses retainer used to further restrain the folded temple 18 relative to the pocket panel 10. The optional second eyeglasses retainer may be positioned deeper within the pocket 8 such that additional holding elements 20, 22 may engage another temple element 16 positioned on the temple 18 farther away from the hinge 34 near the tip of the temple 18. The optional second eyeglasses retainer may be positioned on the pocket panel 10 deeper within the pocket 8 using the inner holding element 22 magnetically attracted to the outer holding element 20. The second eyeglasses retainer may further retain the eyeglasses 2 by magnetically coupling an additional portion of the folded temple 18 to the pocket panel 10.

Figure 11:
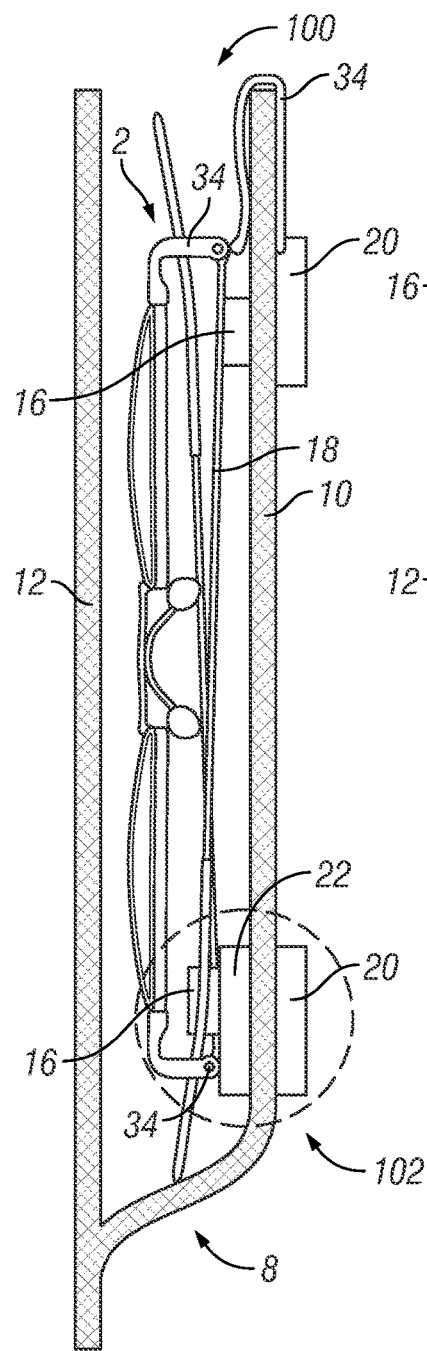
FIG. 11 is a schematic side-view showing a pair of eyeglasses retained inside a pocket, such as, for example, a shirt breast pocket.
Figure 12:
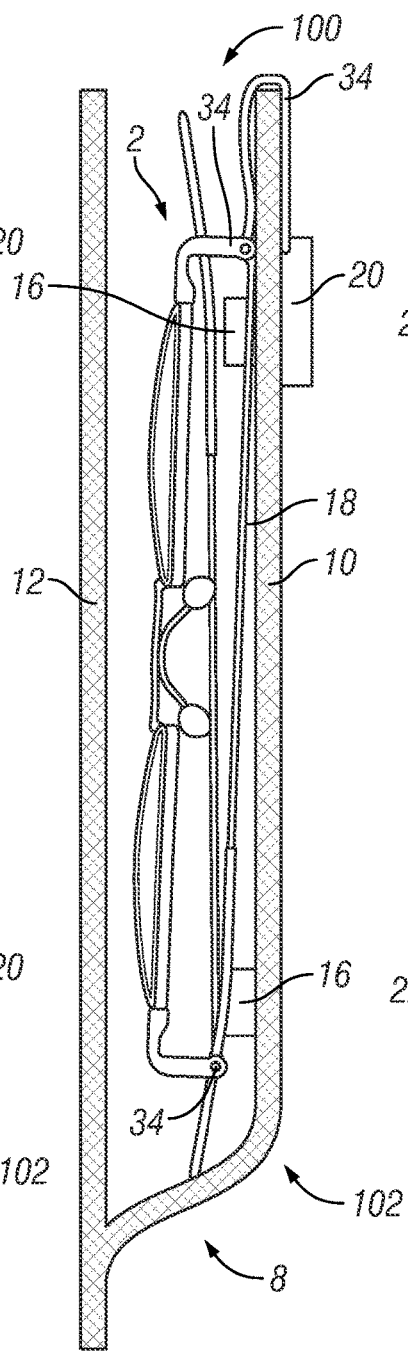
FIG. 12 is a schematic side-view showing a pair of eyeglasses retained inside a pocket, such as, for example, a shirt breast pocket.

In FIGS. 11 and 12, the eyeglasses retainer may be configured to retain the eyeglasses inside the pocket 8 by magnetically coupling the temple 18 of the eyeglasses 2 to the outer holding element 20 from inside the pocket 8. The temple 18 may be restrained by the eyeglasses retainer by magnetically coupling the temple element 16 positioned near the hinge 34 to the outer holding element 20 through the pocket panel 10. In this embodiment, the eyeglasses retainer may be configured such that the temple element 16 may engage with the outer element outer surface 26 from inside the pocket 8 to restrain the temple 18 of the eyeglasses 2 relative to the pocket panel 10. When the temple element 16 on the temple 18 is coupled to the eyeglasses retainer, the pocket panel 10 may be positioned between the temple element 16 and the outer holding element 20.

FIG. 11 also shows the optional second eyeglasses retainer used to further restrain another portion of the temple 18 relative to the pocket panel 10. The optional second eyeglasses retainer may be positioned deeper within the pocket 8 away from the opening to engage another temple element 16 positioned farther away from the hinge 34 near the end of the temple 18. The optional second eyeglasses retainer may be positioned and held on the pocket panel 10 using an inner holding element 22 and an outer holding element 20. The optional second eyeglasses retainer may alternatively be used to restrain a different temple relative to the pocket panel 10.

FIGS. 13-16 show the eyeglasses retainer alternatives configured to retain the eyeglasses 2 using only a single inner holding element 22 magnetically coupled with the temple element 16. The single inner holding element 22 may be held and positioned on the pocket panel 10 using the retainer holder 36. The retainer holder 36 may be engaged over the top edge 38 of the pocket panel 10 which positions the inner holding element 22 near the opening of the pocket 8.

Figure 13:
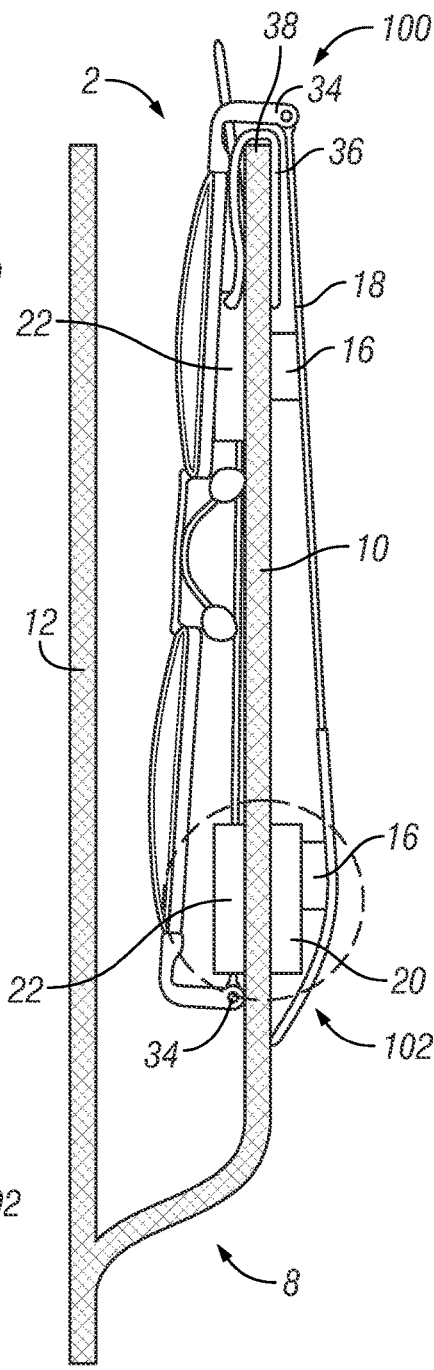
FIG. 13 is a schematic side-view showing a pair of eyeglasses retained inside a pocket, such as, for example, a shirt breast pocket, with a temple element folded over the outer panel of the pocket.

In FIGS. 13 and 14, the eyeglasses retainer may be configured to retain a portion of the eyeglasses inside the pocket 8 by folding the temple 18 of the eyeglasses 2 comprising the temple element 16 over the pocket panel 10. The temple element 16 may be positioned on the temple 18 near the hinge 34 in order to engage the inner holding element 22 positioned by the retainer holder 36. The folded temple 18 may be retained by the eyeglasses retainer by magnetically coupling the temple element 16 with the inner holding element 22 of the eyeglasses 2 through the pocket panel 10. In this embodiment, the eyeglasses retainer may be configured such that the pocket panel 10 is positioned between the temple element 16 and the inner holding element 22 when the folded temple 18 and the eyeglasses 2 are retained.

FIG. 13 also shows the optional second eyeglasses retainer used to further restrain the folded temple 18 relative to the pocket panel 10 near the lower end 102 of the pocket 8. The optional second eyeglasses retainer may be positioned near the bottom of the pocket 8 away from the opening to engage another temple element 16 affixed away from the hinge 34 near the end of the temple 18. The optional second eyeglasses retainer may be positioned and held at a deeper location inside the pocket 8 using an inner holding element 22 and an outer holding element 20.

In FIGS. 15 and 16, the eyeglasses retainer may be configured to retain the eyeglasses inside the pocket 8 by magnetically coupling the temple element 16 positioned on the temple 18 of the eyeglasses 2 with the inner holding element 22 from inside the pocket 8. The temple element 16 may similarly be positioned on the temple 18 near the hinge 34 in order to engage the inner holding element 22 positioned by a retainer holder 36. In this embodiment, the eyeglasses retainer may be configured such that the temple element 16 may engage with the temple surface 32 of the inner holding element 22 to restrain the temple 18 of the eyeglasses 2. When the temple 18 is coupled to the eyeglasses retainer, the temple 18 and temple element 16 are in direct contact with the inner holding element 22.

FIG. 15 also shows the optional second eyeglasses retainer used to further restrain the folded temple 18 to the pocket panel 10. The optional second eyeglasses retainer may be positioned near the bottom of the pocket 8 away from the opening to engage another temple element 16 positioned farther away from the hinge 34 near the end of the temple 18. The optional second eyeglasses retainer may be positioned and held at a deeper location inside the pocket 8 using the inner holding element 22 and the outer holding element 20. The optional second eyeglasses retainer may further retain the eyeglasses 2 by restraining another portion of the same temple 18 to the pocket panel 10, or restraining a different temple to the pocket panel 10.

Turning to FIGS. 17-20, the eyeglasses 2 may be alternatively positioned such that the lens of the eyeglasses 2 may be outside of the pocket 8 when the eyeglasses 2 are coupled with the eyeglasses retainer. When coupled to the eyeglasses retainer, the temple 18 of the eyeglasses 2 comprising the temple element 16 may be folded over the top edge 38 of the pocket panel 10 such that the folded temple 18 may be inside the pocket 8 while the lens of the eyeglasses 2 are in contact with the outer surface 28 of the pocket panel 10.

Figure 17:
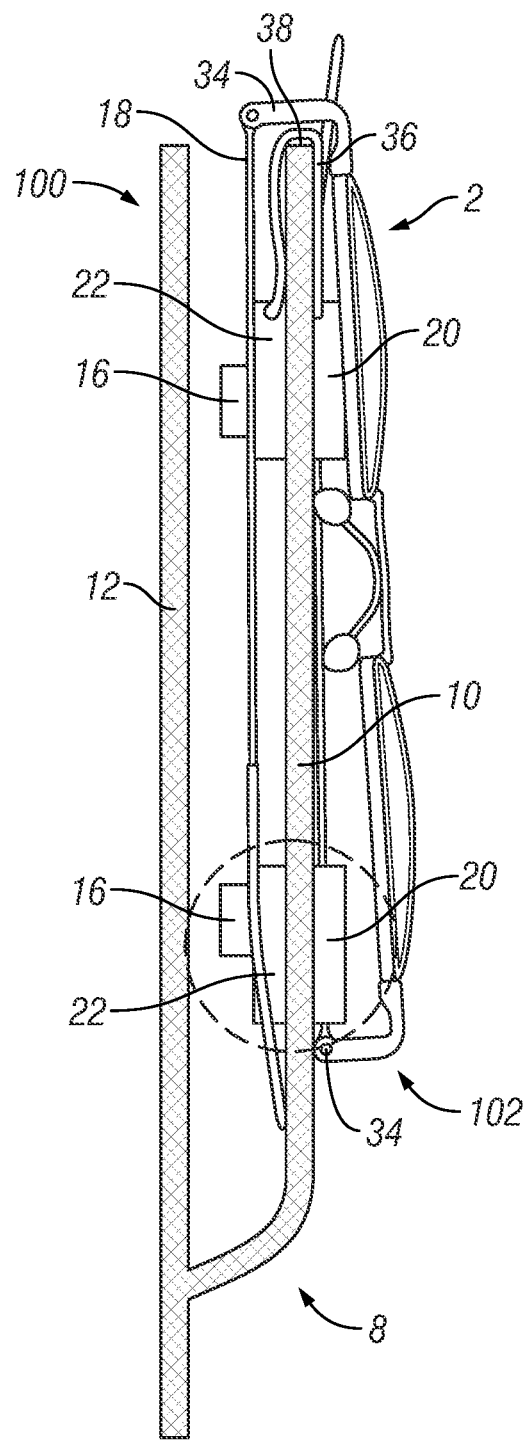
FIG. 17 is a schematic side-view showing a pair of eyeglasses retained outside a pocket, such as, for example, a shirt breast pocket, with a temple element folded over the outer panel of the pocket.
Figure 18:
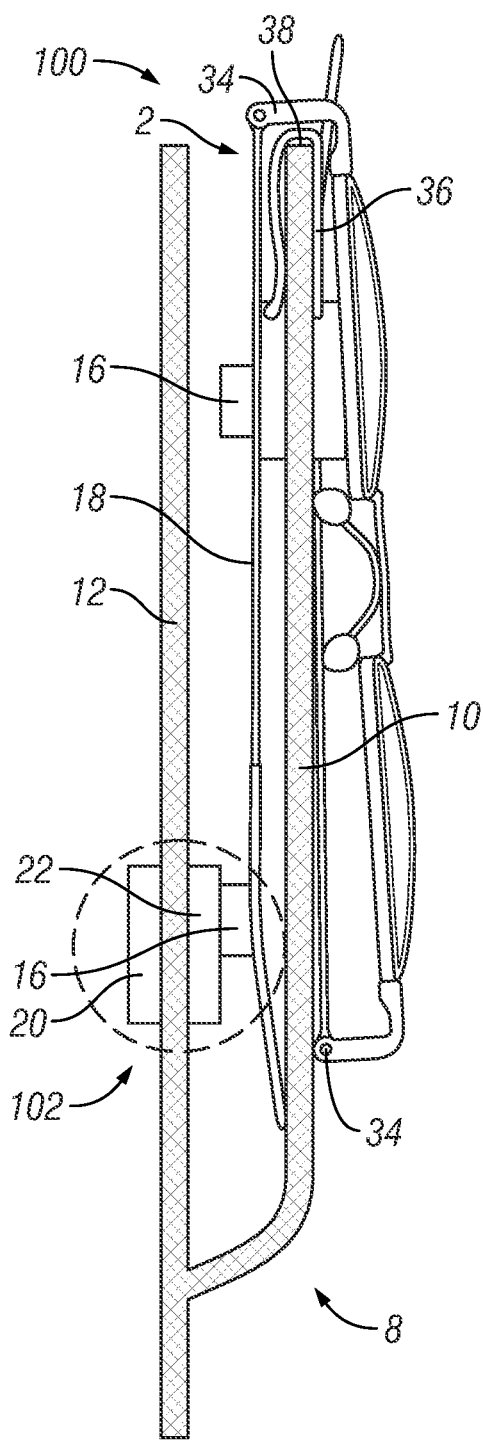
FIG. 18 is a schematic side-view showing a pair of eyeglasses retained outside a pocket, such as, for example, a shirt breast pocket, with a temple element folded over the outer panel of the pocket.

FIGS. 17-18 show the eyeglasses retainer configured with the inner holding element 22 and the outer holding element 20 engaging the pocket panel 10 and positioned near the opening of the pocket 8 with the retainer holder 36. Alternatively, the inner holding element 22 and the outer holding element 20 may be positioned without use of the retainer holder 36, the retainer may be configured with just the retainer holder 36 and the inner holding, or the retainer may be configured with just the retainer holder 36 and the outer holding element 20.

When the inner holding element 22 and the outer holding element 20 are positioned and held near the opening of the pocket 8 with or without the retainer holder 36, or when the inner holding element 22 is engaged with the pocket panel 10 using only the retainer holder 36, the eyeglasses retainer may restrain the folded temple 18 by magnetically coupling the temple element 16 positioned near the hinge 34 of the eyeglasses 2 to the temple surface 32 of the inner holding element 22. Alternatively when only the outer holding element 20 is engaged with the pocket panel 10 using the retainer holder 36, the folded temple 18 may be restrained by magnetically coupling the temple element 16 to the outer holding element 20. When the temple element 16 and the outer holding element 20 are coupled, the pocket panel 10 may be positioned between the engagement of the temple element 16 and the outer holding element 20.

FIG. 17 also shows the optional second eyeglasses retainer used to further restrain the folded temple 18 to the pocket panel 10. The holding elements 20, 22 of the optional second eyeglasses retainer may be positioned deeper near the lower end 102 of the pocket 8 away from the opening to engage another temple element 16 positioned on the folded temple 18 farther away from the hinge 34 near the tip of the temple 18. The optional second eyeglasses retainer may be positioned and held at a deeper location inside the pocket 8 using an inner holding element 22 and an outer holding element 20. The temple element 16 of the second eyeglasses retainer may further retain the folded temple 18 by magnetically coupling with the inner holding element 22 of the second eyeglasses retainer.

FIG. 18 shows a further embodiment with an optional second eyeglasses retainer used to restrain a separate portion of the folded temple 18 to the shirt panel 12. The optional second eyeglasses retainer may be positioned deeper within the pocket 8 to engage another temple element 16 positioned on the folded temple 18 farther away from the hinge 34 near the tip of the temple 18. The optional second eyeglasses retainer may be positioned and held at a deeper location on the shirt panel 12 using an inner holding element 22 and an outer holding element 20. The optional second eyeglasses retainer may further retain the eyeglasses 2 by restraining a second portion of the folded temple 18 to a different panel inside the pocket 8.

In one aspect, more than one eyeglasses retainer on a certain panel may be used to further couple the eyeglasses 2 to the engaged panel. In another aspect, more than one eyeglasses retainers may be used on different panels in the pocket 8 to couple the pair of eyeglasses 2 to more than one panel.

Referring to FIGS. 3, 6, 9, 10, 13, 14, 17 and 18, the temple elements 16 are shown positioned on the temple 18 folded over the top edge 38 of the pocket panel 10 on the opposite side of the pocket panel 10 from the lenses of the eyeglasses 2. However, the temple elements 16 (not shown) could additionally or alternatively be positioned on the temple 18 folded on the same side of the pocket panel 10 as the lenses of the eyeglasses 2. Such temple elements 16 positioned on the same side of the pocket panel 10 as the lenses may be positioned to magnetically couple with one or more of the holding elements 22, 20.

Figure 19:
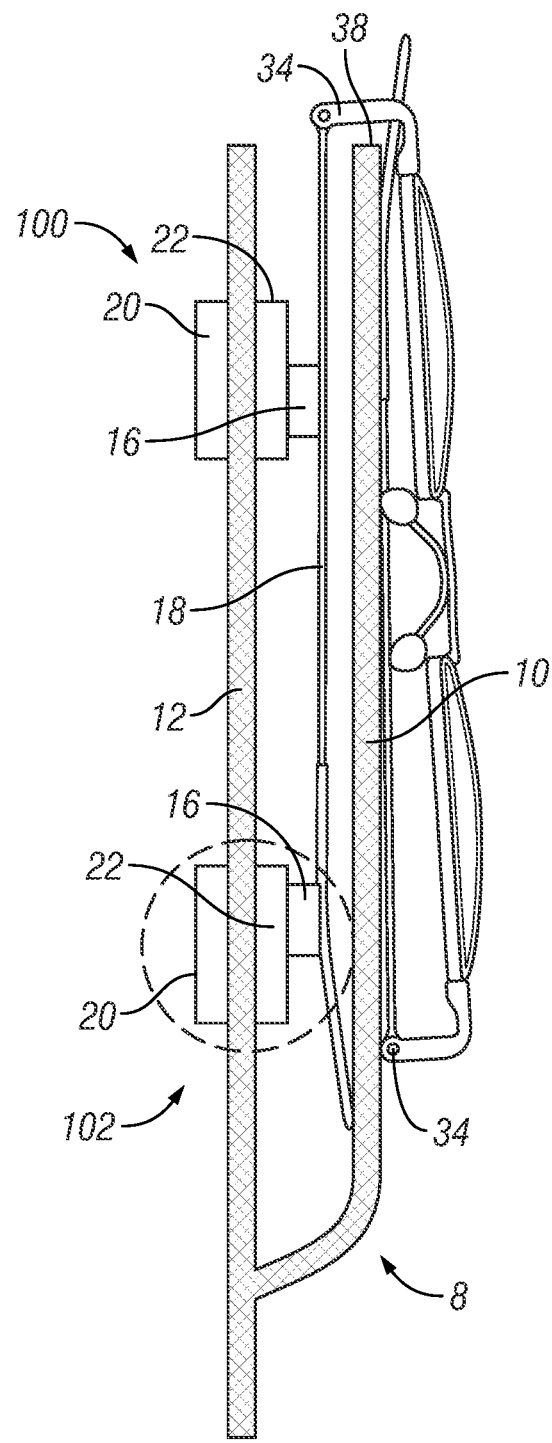
FIG. 19 is a schematic side-view showing a pair of eyeglasses retained outside a pocket, such as, for example, a shirt breast pocket, with a temple element folded over the outer panel of the pocket.
Figure 20:
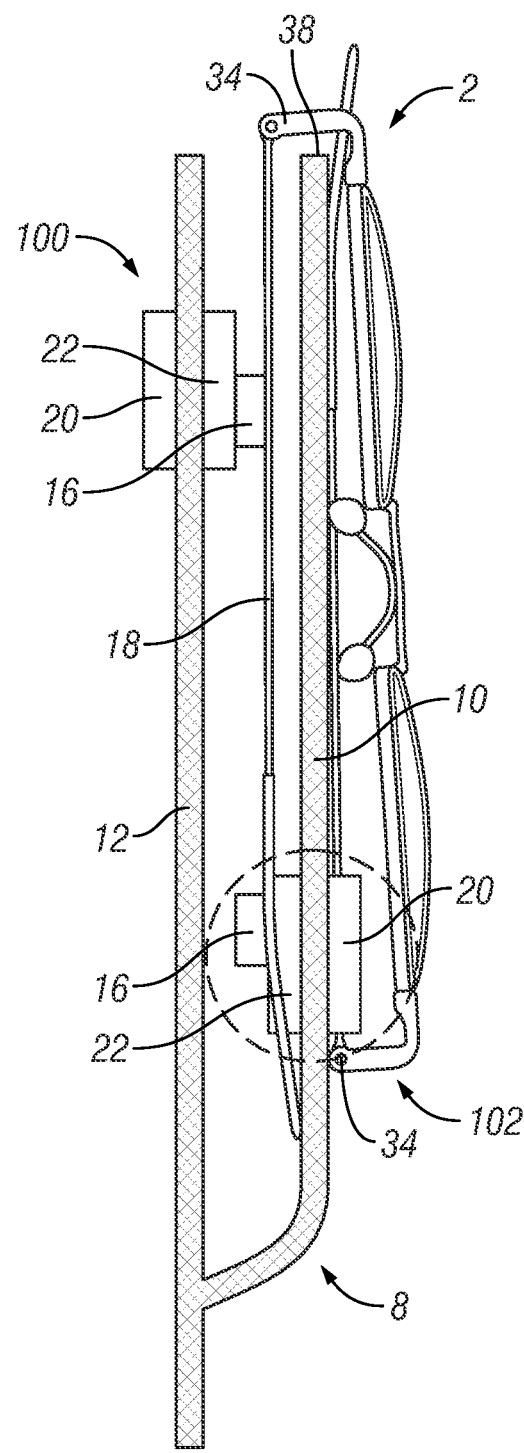
FIG. 20 is a schematic side-view showing a pair of eyeglasses retained outside a pocket, such as, for example, a shirt breast pocket, with a temple element folded over the outer panel of the pocket.

FIGS. 19-20 show the eyeglasses retainer configured with the inner holding element 22 and the outer holding element 20 on the shirt panel 12 and positioned near the opening of the pocket 8. The eyeglasses retainer may retain the folded temple 18 inside the pocket 8 by magnetically coupling the temple element 16 positioned near the hinge 34 of the folded temple 18 with the inner holding element 22 positioned on the shirt panel 12. The exact contact point the folded temple 18 and the eyeglasses retainer may vary depending on the size of the eyeglasses 2 and the position of the temple element 16 positioned on the folded temple 18. The holding elements 20, 22 may then be positioned on the shirt panel 12 to align the holding elements 20, 22 with the temple element 16 to restrain the eyeglasses 2 relative to the shirt panel 12.

FIG. 19 also shows an optional second eyeglasses retainer used on the shirt panel 12 to further retrain the folded temple 18 to the shirt panel 12. The optional second eyeglasses retainer may be positioned deeper within the pocket 8 and away from the opening to engage another temple element 16 positioned on the folded temple 18 farther away from the hinge 34 near the tip of the temple 18. The optional second eyeglasses retainer may be positioned and held using an inner holding element 22 and an outer holding element 20. The temple element 16 of the second eyeglasses retainer may further retain the folded temple 18 by magnetically coupling the second temple element 16 with the inner holding element 22 of the second eyeglasses retainer.

FIG. 20 shows a further embodiment of the example shown in FIG. 18 with an optional second eyeglasses retainer used on the pocket panel 10 to also retrain the folded temple 18 relative to the pocket panel 10. The optional second eyeglasses retainer may be positioned at the bottom of the pocket 8 away from the opening to engage another temple element 16 positioned on the folded temple 18 farther away from the hinge 34 near the tip of the temple 18. The optional second eyeglasses retainer may be positioned and held at a deeper location inside the pocket 8 using an inner holding element 22 and an outer holding element 20. The optional second eyeglasses retainer may further retain the eyeglasses 2 by restraining another portion of the folded temple 18 farther to the pocket panel 10.

Due to the schematic nature of the drawing figures, one or more figures may appear to one or more structures intersecting. Certain components may be shown enlarged for clarity, and side views have been used to illustrate certain aspects of the invention. None of the foregoing are intended to limit conventional design, construction, sizing, or material selection.

Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of exemplary embodiments. Accordingly, it is appropriate that any claims supported by this description be construed broadly and in a manner consistent with the scope of the invention.

The invention claimed is:

1. A first eyeglasses retainer for resisting removal of a pair of eyeglasses from a pocket of a garment, comprising:
   a first holding member, at least a portion of the first holding member configured to be disposed within a garment pocket and abutting an outer surface of the pocket outer panel facing the interior of the garment pocket, the first holding member positionable within the pocket separately from the pair of eyeglasses; and
   a second holding member, at least a portion of the second holding member configured to be disposed outside the garment pocket and abutting an outer surface of the pocket outer panel facing outside of the garment pocket, the second holding member positionable outside the pocket separately from the pair of eyeglasses;
   wherein one or both of the first and second holding members comprising a magnet;
   wherein the first and second holding members are configured to allow placement in first relative positions on the pocket outer panel, the first relative positions comprising the first and second holding members magnetically attracting together against the pocket outer panel to resist movement of a least a portion of the first and second holding members relative to the panel;
   wherein the first and second holding members are configured to allow their placement in second relative positions, the second relative positions comprising at least one of the first and second holding members not being magnetically attracted to the other member such that at least one of the first and second holding members does not abut an outer surface of the pocket outer panel; and
   a pair of eyeglasses at least partially disposed within the garment pocket, wherein a magnetic attractive force between at least magnetic material secured to or comprising at least a portion of the eyeglasses and one or both of the first and second holding members positioned in the first relative positions on the pocket outer panel resists removal of the eyeglasses from the garment pocket.

2. The apparatus of claim 1, wherein the magnetic material secured to or comprising at least a portion of the eyeglasses further comprising a retaining member secured to or comprising at least a portion of the eyeglasses, the retaining member magnetically attracted to one or both of the first and second holding members.

3. The apparatus of claim 2, wherein the retaining member comprises a magnet.

4. The apparatus of claim 2, wherein the retaining member is disposed adjacent to one end of the eyeglasses.

5. The apparatus of claim 2, wherein the retaining member is secured to or comprises at least a portion of a temple member of the eyeglasses.

6. The apparatus of claim 5, wherein the temple member is folded over the pocket outer panel and at least a portion of the retaining member is disposed outside of the garment pocket.

7. The apparatus of claim 5, wherein the temple member is folded over the pocket outer panel and at least a portion of the retaining member is disposed inside of the garment pocket.

8. The apparatus of claim 2, wherein at least a portion of the retaining member is disposed adjacent to one end of the eyeglasses.

9. The apparatus of claim 2, wherein the retaining member is secured to or comprises at least a portion of a temple member of the eyeglasses, the temple member comprising a hinged end, and wherein at least a portion of the retaining member is disposed adjacent to the hinged end of the temple member.

10. The apparatus of claim 2, wherein the retaining member is secured to or comprises at least a portion of a temple member of the eyeglasses, the temple member comprising an unhinged end, and wherein at least a portion of the retaining member is disposed adjacent to the unhinged end of the temple member.

11. The apparatus of claim 2, wherein the surface of the first holding member has a friction surface comprising rubber contacting and frictionally engaging the eyeglasses or the retaining member.

12. The apparatus of claim 1, further comprising a flexible member secured between the first and second holding members, and wherein the flexible member is configured to position the first and second holding members on opposite sides of the pocket outer panel.

13. The apparatus of claim 12, wherein the flexible member secured between the first and second holding members comprises a flexible strap.

14. The apparatus of claim 1, wherein at least a portion of the pocket outer panel forms an opening of the garment pocket and wherein the first and second holding members are disposed adjacent to the opening of the garment pocket.

15. The apparatus of claim 1, wherein at least a portion of the pocket outer panel forms a closed end of the garment pocket and wherein the first and second holding members are disposed on the pocket outer panel adjacent the closed end of the pocket.

16. The apparatus of claim 1, wherein the first and second holding members are positioned adjacent the top of the garment pocket.

17. The apparatus of claim 1, wherein the first and second holding members are positioned adjacent the bottom of the garment pocket.

18. The apparatus of claim 1 further comprising a second eyeglasses retainer, the second eyeglasses retainer comprising:
   a first holding member, at least a portion of the first holding member configured to be disposed within the garment pocket and abutting an outer surface of the pocket outer panel facing the interior of the garment pocket, the first holding member positionable within the pocket separately from the pair of eyeglasses; and a second holding member, at least a portion of the second holding member configured to be disposed outside the garment pocket and abutting an outer surface of the pocket outer panel facing outside of the garment pocket, the second holding member positionable outside the pocket separately from the pair of eyeglasses;

wherein the first and second holding members are configured to allow placement in first relative positions on the pocket outer panel, the first relative positions comprising the first and second holding members magnetically attracting together against the pocket outer panel to resist movement of a least a portion of the first and second holding members relative to the panel;

wherein the first and second holding members are configured to allow their placement in second relative positions, the second relative positions comprising at least one of the first and second holding members not being magnetically attracted to the other member such that at least one of the first and second holding members does not abut an outer surface of the pocket outer panel;

wherein a magnetic attractive force between at least magnetic material secured to or comprising at least a portion of the eyeglasses and one or both of the first and second holding members positioned in the first relative positions on the pocket outer panel resists removal of the eyeglasses from the garment pocket.

19. A method of retaining a pair of eyeglasses with a panel of a garment, comprising:

placing a first holding member separately from the pair of eyeglasses within a garment pocket in a first position such that the first holding member is abutting a surface of a pocket panel facing the interior of the garment pocket, wherein the first holding member is removable from the pocket panel;

placing a second holding member separately from the pair of eyeglasses outside the garment pocket in a first position such that the second holding member is abutting a surface of the pocket panel facing outside the garment pocket, wherein the second holding member is removable from the pocket panel;

wherein one or both of the first and second holding members comprises a magnet configured such that by the placing of the first and second holding members in their respective first positions on the pocket panel, the first and second holding members are magnetically attracted to each other and against oppositely facing surfaces of the pocket panel with a first magnetic attractive force, such that the first magnetic force prevents movement of the first and second holding members from their respective first positions on the pocket panel; and placing at least a magnetically attractive portion of pair of eyeglasses within the garment pocket, the magnetically attractive portion of the eyeglasses comprising or having secured thereto material magnetically attracted to one or both of the first and second holding members, such that a second magnetic attractive force between the magnetically attractive portion of the pair of eyeglasses and one or both of the first and second holding members in their respective first positions on the pocket panel magnetically retains the eyeglasses within the garment pocket.

20. The method of claim 19, wherein the pocket panel is one of either the inner pocket panel or the outside pocket panel, wherein the outside pocket panel is the outermost panel when the garment is worn.

* * * * *